(12) United States Patent
Laxman et al.

(10) Patent No.: US 8,126,891 B2
(45) Date of Patent: Feb. 28, 2012

(54) FUTURE DATA EVENT PREDICTION USING A GENERATIVE MODEL

(75) Inventors: Srivatsan Laxman, Bangalore (IN); Vikram Tankasali, Bangalore (IN); Ryen White, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/255,556

(22) Filed: Oct. 21, 2008

(65) Prior Publication Data
US 2010/0100517 A1 Apr. 22, 2010

(51) Int. Cl.
G06F 15/18 (2006.01)
G06F 17/30 (2006.01)
(52) U.S. Cl. ......................... 707/736; 706/21
(58) Field of Classification Search .............. 706/21; 707/736
See application file for complete search history.

(56) References Cited

U.S. PATENT DOCUMENTS

| | | | |
|---|---|---|---|
| 6,687,696 B2 * | 2/2004 | Hofmann et al. ............ 1/1 |
| 6,826,569 B2 | 11/2004 | Robertson | |
| 6,910,003 B1 * | 6/2005 | Arnold et al. ............ 704/4 |
| 7,233,933 B2 * | 6/2007 | Horvitz et al. ............ 706/21 |
| 7,363,308 B2 * | 4/2008 | Dillon et al. ............ 707/706 |
| 7,899,761 B2 * | 3/2011 | Kadambe et al. ............ 706/12 |
| 2003/0078766 A1 * | 4/2003 | Appelt et al. ............ 704/9 |
| 2003/0101187 A1 * | 5/2003 | Gaussier et al. ............ 707/100 |
| 2003/0101449 A1 * | 5/2003 | Bentolila et al. ............ 725/10 |
| 2004/0002994 A1 * | 1/2004 | Brill et al. ............ 707/104.1 |
| 2004/0024773 A1 * | 2/2004 | Stoffel et al. ............ 707/102 |
| 2004/0153288 A1 | 8/2004 | Tovinkere et al. | |
| 2004/0158469 A1 * | 8/2004 | Brand ............ 704/240 |
| 2006/0106743 A1 * | 5/2006 | Horvitz ............ 706/21 |
| 2006/0224579 A1 * | 10/2006 | Zheng ............ 707/5 |
| 2007/0005646 A1 | 1/2007 | Dumais et al. | |
| 2007/0136264 A1 | 6/2007 | Tran | |
| 2008/0002791 A1 | 1/2008 | Gratrix et al. | |
| 2008/0071721 A1 * | 3/2008 | Wang et al. ............ 706/48 |
| 2008/0154821 A1 | 6/2008 | Poulin | |

OTHER PUBLICATIONS

Mannila, et al., "Discovery of Frequent Episodes in Event Sequences", Data Mining and Knowledge Discovery 1, 1997, pp. 259-289.
Schatten, et al., "Efficient Indexing and Searching in Correlated Business Event Streams", Apr. 25, 2006, pp. 1-127.
Heath, et al., "Defection Detection: Predicting Search Engine Switching", ACM, WWW, Apr. 21-25, 2008, 2 pages.
Montgomery, et al., "Modeling Online Browsing and Path Analysis Using Clickstream Data", Marketing Science, vol. 23, No. 4, Fall 2004, 36 pages.
Juan, et al., "An Analysis of Search Engine Switching Behavior Using Click Streams", ACM, WWW 2005, May 10-14, 2005, pp. 1050-1051.
Li, et al., "A Probabilistic Model for Retrospective News Event Detection", ACM, SIGIR'05, Aug. 15-19, 2005, pp. 106-113.

(Continued)

*Primary Examiner* — James Trujillo
*Assistant Examiner* — Jorge A Casanova
(74) *Attorney, Agent, or Firm* — Alleman Hall McCoy Russell & Tuttle LLP

(57) ABSTRACT

The prediction of future data events using a generative model is disclosed. One disclosed embodiment comprises a method of predicting a search engine switch, by first tracking a sequence of events in a user search. Next, a search engine switch based upon the sequence of events tracked is predicted. Then, in response to predicting a search engine switch and prior to the user requesting a search engine switch, an action is taken toward changing a user experience.

20 Claims, 5 Drawing Sheets

OTHER PUBLICATIONS

White, et al., "Investigating Behavioral Variablity in Web Search", ACM, WWW 2007, May 8-12, 2007, pp. 21-30.

Downey, et al., "Models of Searching and Browsing: Language, Studies and Application", (IJCAI 2007), 8 pages.

* cited by examiner

FUTURE DATA EVENT PREDICTION USING A GENERATIVE MODEL

BACKGROUND

Predicting occurrences of events in sequential data is an issue in temporal data mining. Large amounts of sequential data are gathered in various domains such as biology, manufacturing, network usage, finance, etc. As such, the reliable prediction of future occurrences of events in sequential data may have applications in such domains. For example, predicting major breakdowns from a sequence of faults logged in a manufacturing plant may help to avoid future breakdowns, and therefore improve plant throughput.

One approach to predicting occurrences of future events in categorical sequences uses rule-based methods. For example, rule-based methods have been used for predicting rare events in event sequences with application to detecting system failures in computer networks. In such an approach, "positive" and "negative" data sets are created using windows that precede a target event and windows that do not, respectively. Frequent patterns of unordered events are discovered separately in both data sets and confidence-ranked collections of positive-class and negative-class patterns are used to generate classification rules.

Another rule-based method, called a genetic algorithm-based approach, is used to predict rare events, and begins by defining "predictive patterns" as sequences of events with some temporal constraints between connected events. A genetic algorithm is then used to identify a diverse set of predictive patterns, where a disjunction of such patterns constitutes the classification rules. Yet another rule-based method learns multiple sequence generation rules to infer properties, in the form of rules, about future events in the sequence.

SUMMARY

Various embodiments related to the prediction of future data events using a generative model are disclosed herein. For example, one disclosed embodiment comprises a method of predicting a search engine switch. First, a sequence of events are tracked in a user search. Next, a search engine switch is predicted based upon the sequence of events tracked. Then, in response to predicting a search engine switch and prior to the user requesting a search engine switch, an action is taken toward changing a user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
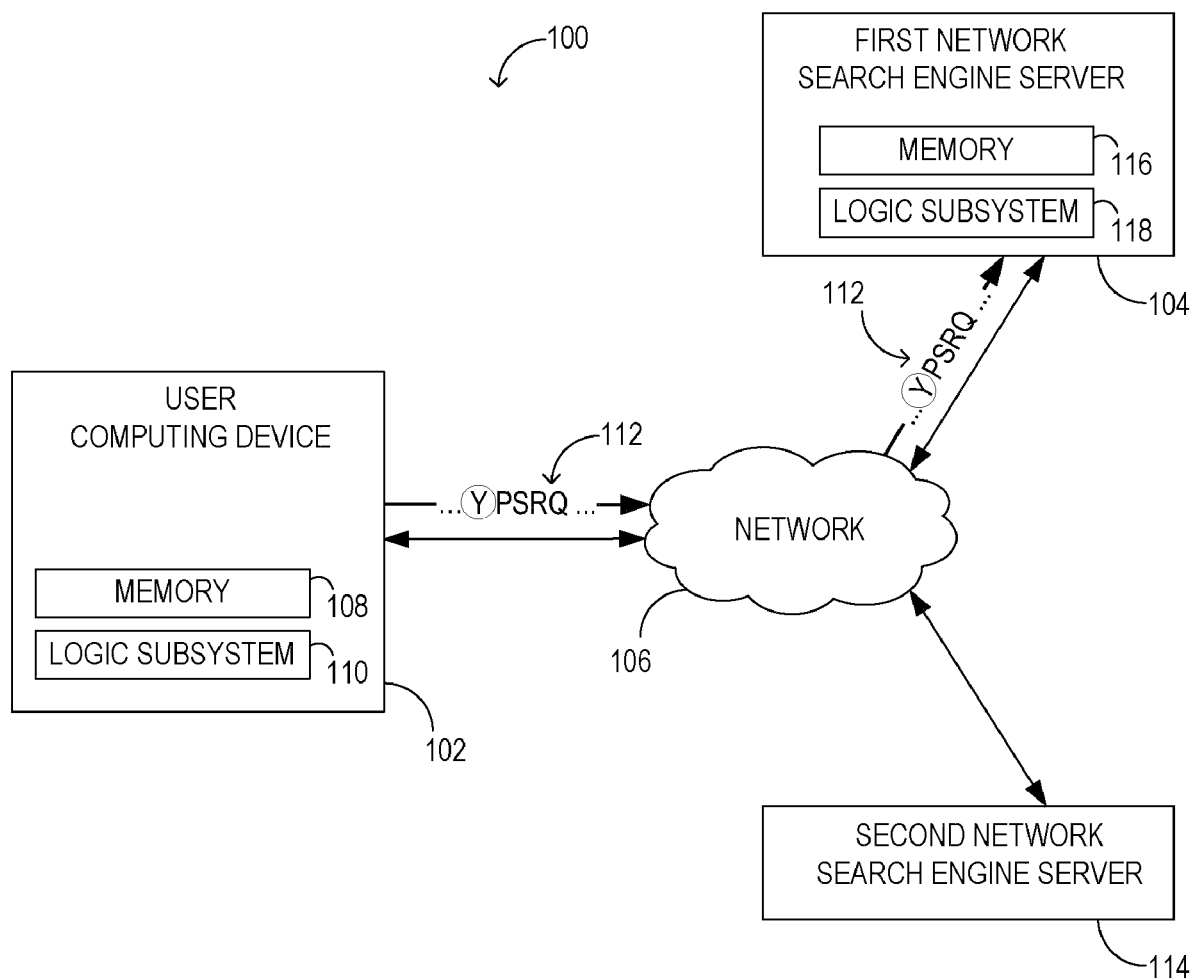
FIG. 1 shows an embodiment of a network search engine environment.

FIG. 1 illustrates a system 100 comprising user computing device 102 interacting with first network search engine server 104 and second network search engine server 114 via network 106. User computing device 102 further comprises memory 108 and logic subsystem 110, which comprises one or more processors and other logic components. Memory 108 comprises instructions executable by the logic subsystem 110 to receive user input during a search engine session, and to communicate with first network search engine server 104 and/or second network search engine server 114 during a user session. First network search engine server 104 also comprises memory 116 and logic subsystem 118, which comprises one or more processors and other logic components. Memory 116 comprises instructions executable by the logic subsystem 118 to operate a search engine, to communicate with user computing device 102 during a user session, and to perform the various methods of predicting a search engine switch that are described herein. It will be understood that the second network search engine server also includes such components, which are omitted from FIG. 1 for clarity.

As a user of computing device 102 engages in a search engine use session with first network search engine server 104, a stream of events 112 is created. Within stream of events 112 there exists a sequence of events, representing a search session. Within a search session there exists one or more episodes, each episode comprising an ordered sequence of events. As shown in FIG. 1, PSRQ is an example of an episode preceding a target event Y. Each event may be associated with a value from a finite set of events, each value corresponding to an action received from computing device 102 or to a feature of a page visited by a user of computing device 102 during the search engine use session. Such features, which may be referred to herein as "page features", may include one or more of a display time of a page, a type or item of content on a page, or any other suitable feature that is connected to a page being viewed.

Search engine companies derive revenue based at least in part on a number of users of the services offered by the search engine company. Therefore, such a company may be interested in retaining as many users as well as in attracting as many new users as possible. Thus, a provider of the first network search engine server 104 may wish to predict when a user of the first network search engine server 104 will request to change to the second network search engine server 114 (i.e. ending the search session with the first network search engine server 104 and initiating a search session with the second network search engine server 114). Thus, various embodiments are described herein that allow a search engine provider to predict a search engine switch by tracking a sequence of events in a user search and predicting a search engine switch based upon the sequence of events tracked. The user search may include one or more of a user search session. Further, in response to such a prediction, the search engine provider may send a message to the user to initiate contact with the user and thereby to attempt to retain the user prior to the user requesting a switch. In other embodiments, the second network search engine server 114 may anticipate a switch from the first network search engine server 104 to the second network search engine server 114, and act in response to this anticipation. Such a response action may include pre-fetching search results. For example, such embodiments may include the second network search engine server 114 running a browser-toolbar plug-in to monitor search behavior on the first network search engine server. The embodiments disclosed herein may also be applicable to other episode-based predictions, including but not limited to predicting occurrences of events in sequential data gathered in various other domains such as biology, manufacturing, network usage and finance.

Figure 2:
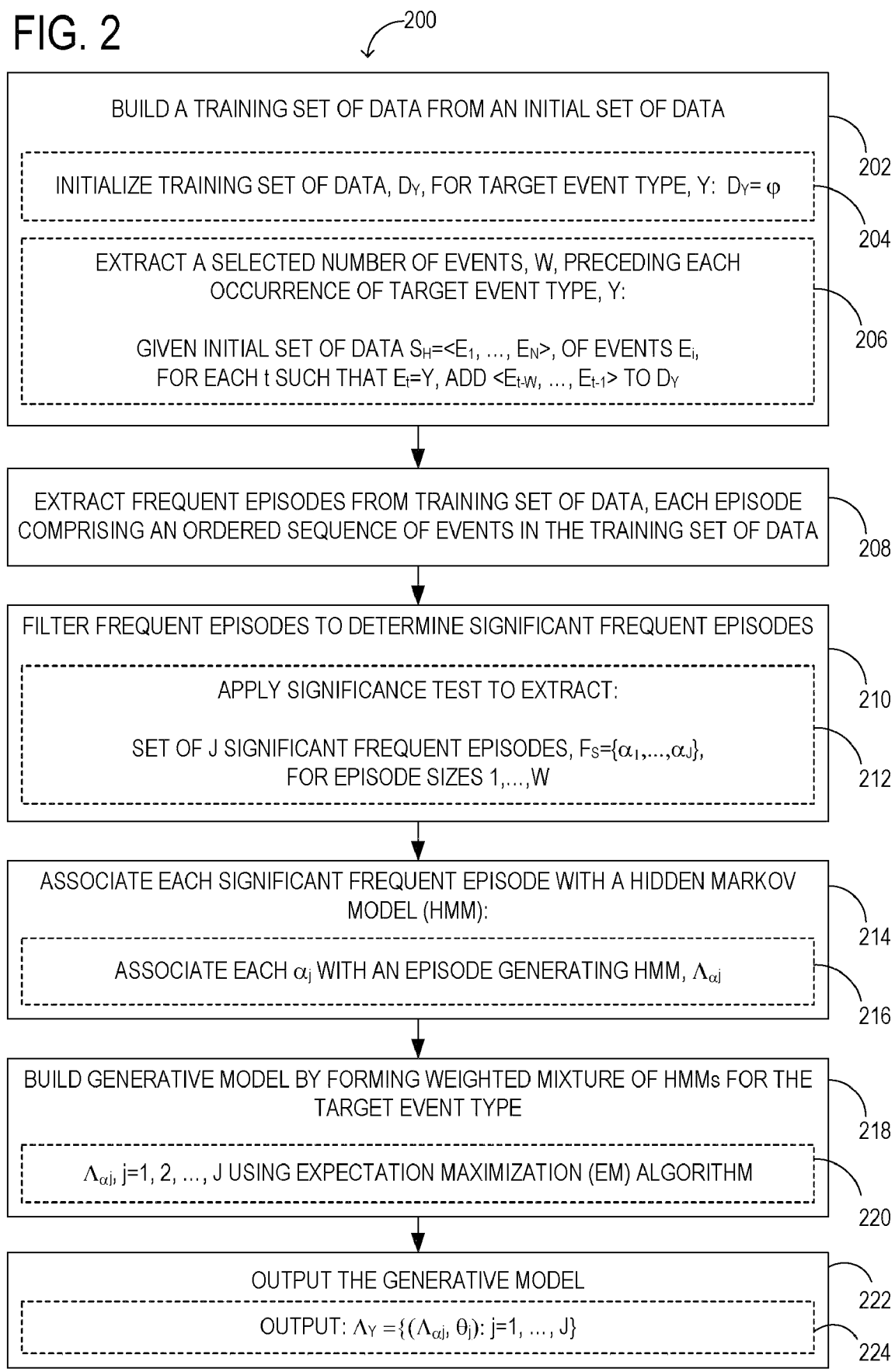
FIG. 2 shows a process flow depicting an embodiment of a method of building a generative model for predicting a future occurrence of a target event.

The disclosed embodiments utilize a type of Hidden Markov Model (HMM) that may be referred to as an Episode-Generating HMM (EGH). This model also may be referred to herein as a "generative model" in that the model generates a prediction based upon a stream of events. Before utilizing such a generative model, the generative model is built for a desired target event, such as a user-requested switch of search engines. FIG. 2 illustrates an embodiment of a method 200 of building a generative model for predicting a future occurrence of a target event type, Y, based upon a plurality of preceding events $E_i$. It will be understood that the model may be built and used on a single computing device or system (e.g. first network search engine server 104 and/or second network search engine server 114), or may be built on a different computing device than on which it is used.

Method 200 comprises, at 202, building a training set of data from an initial set of data. Given the initial set of data, $s_H = \langle E_1, \ldots, E_n, \ldots \rangle$, comprising a plurality of sequences of events, a selected number of events preceding each occurrence of an event of a target event type from the initial set of data are extracted, as described in detail below. In the specific example of a search engine use case, a single sequence of events may correspond to a single user search session, and a target event type may be a request to switch search engines. For n being the current time instant, each event, $E_i$, takes values from a finite set E, of possible event types. $Y \in E$ denotes the target event type whose occurrences are to be predicted in the streams. Therefore, it is desired to predict, at each time instant n, whether or not the next event $E_{n+1}$, in the stream $s_H$, will be of the target event type Y. In other embodiments, there may be more than one target event type to predict in the problem.

Thus, for $Y \in E$ denoting a set of target event types, it may be of interest to predict, based on events observed in the stream up to time instant n, whether or not $E_{n+1} = Y$. To build a prediction model for a target event type Y, an event window preceding occurrences of Y in the stream $s_H$ is examined. K denotes a number of occurrences of the target event type Y, in the data stream $s_H$.

Continuing with FIG. 2, building a training set of data at 202 comprises extracting events from $s_H$ to form a training set of data $D_Y$. The training set of data may be built in any suitable manner. One suitable manner is shown at 204 and 206. First, as indicated at 204, $D_Y$ is initialized by setting $D_Y = \phi$. Then, at 206, a selected number W of events preceding each event of target event type Y are extracted from the initial set of data. In various embodiments, W may be a fixed (i.e. hard-coded) value, or may be a user-defined parameter. Thus, for each t such that $E_t = Y$, $\langle E_{t-W}, \ldots, E_{t-1} \rangle$ may be added to $D_Y$. This yields $D_Y = \{X_1, X_2, \ldots X_K\}$ where each $X_i$, i=1, \ldots, K is the W-length slice, or event window, from $s_H$, that immediately preceded the $i^{th}$ occurrence of Y in $s_H$. The $X_i$'s are referred to as the preceding sequences of Y in $s_H$.

Next, statistics of the W-length sequences preceding Y may be determined for future use in predicting future occurrences of Y in the data. This may be done by learning a generative model, $\Lambda_Y$, in the form of a mixture of specialized HMMs for Y, using the $D_Y$ that was constructed at 202. In one embodiment, constructing such a model may be done in two stages. In the first stage, a frequent episode technique may be used, where such technique has been adapted to mine multiple sequences rather than a single long event stream, to discover the frequent episodes in $D_Y$.

Method 200 at 208 comprises extracting frequent episodes from the training set of data $D_Y$, where each episode comprises an ordered sequence of events in the training set of data $D_Y$, wherein determining each frequent episode for extracting comprises detecting non-overlapping occurrences of the episode in the training set of data.

For example, consider the set of K event sequences introduced above, $D_Y = \{X_1, X_2, \ldots, X_K\}$, where each $X_i$ is an event sequence constructed over the finite set, E, of possible event types. The size of the set is given by $|E|=M$. The patterns in the framework are episodes, where an episode is an ordered tuple of event types. For example, $(A \rightarrow B \rightarrow C)$, is an episode of size 3. An episode is said to occur in an event sequence if there exist events in the sequence appearing in the same relative ordering as in the episode.

Any suitable definition of episode frequency may be used to define frequent episodes for extraction. For example, in one embodiment, the frequency of an episode may be defined as a non-overlapped occurrences-based frequency, adapted to the case of multiple event sequences. Two occurrences of an episode, $\alpha$, are said to be non-overlapped if no events associated with one occurrence appear in the other occurrence. A collection of occurrences of $\alpha$ is said to be non-overlapped if every pair of occurrences in it is non-overlapped. The frequency of $\alpha$ in an event sequence may be defined as the cardinality of the largest set of non-overlapped occurrences of $\alpha$ in the sequence. With these definitions, the frequency of episode, $\alpha$, in a data set, $D_Y$, of event sequences, may be defined as the sum of sequence-wise frequencies of $\alpha$ in the event sequences that constitute $D_Y$.

Method 200 next comprises, at 210, filtering the plurality of frequent episodes to determine a plurality of significant frequent episodes. In one embodiment, process 210 may comprise, at 212, applying a significance test based on a frequency of the frequent episode, a length of the training set and a size of the finite set of events. Details of such a significance test are as follows.

Consider an N-node episode, $\alpha$, whose frequency in the data, $D_Y$, is $f_\alpha$. The significance test for $\alpha$ scores the alternate hypothesis, $[H_1:D_Y$ is drawn from the EGH, $\Lambda_\alpha]$, against the null hypothesis, $[H_0:D_Y$ is drawn from an independent, identically distributed source]. An upper bound, $\epsilon$ for the Type I error probability, (i.e. the probability of wrong rejection of $H_0$) is chosen. Taking T to be the total number of events in all the sequences of $D_Y$ put together, and M to be the size of the set E, the significance test rejects $H_0$ (i.e. it declares $\alpha$ as significant) if $$f_\alpha > \frac{\Gamma}{N},$$

where Γ is determined as follows:

$$\Gamma = \frac{T}{M} + \sqrt{\left(\frac{T}{M}\right)\left(1 - \frac{1}{M}\right)} \Phi^{-1}(1 - \varepsilon).$$

Here $\Phi^{-1}(\bullet)$ denotes the inverse cumulative distribution function of the standard normal random variable. For $\epsilon=0.5$, $\Gamma=(T/M)$ may be obtained, and the threshold increases for smaller values of $\epsilon$. For typical values of T and M, T/M may be the dominant term in the expression for Γ, and hence, $$\frac{T}{NM}$$

may be used as the frequency threshold to obtain significant N-node episodes.

One feature of this significance test is that there is no need to explicitly estimate any HMMs to apply the test. The theoretical connections between episodes and EGHs allows for a test of significance that is based only on frequency of the episode, length of the data sequence and size of the set.

Continuing with FIG. 2, at 212, upon applying such a frequency test, a set of J significant frequent episodes may be obtained, $F_s=\{\alpha_i, \ldots, \alpha_J\}$, for episode sizes, 1, ..., W. Method 200 next comprises, at 214, associating each significant frequent episode with a HMM in which a frequency ordering among the significant frequent episodes is preserved as a likelihood ordering among a corresponding mixture of HMMs. This may be performed in any suitable manner. For example, in one embodiment, process 214 further comprises, at 216, associating each significant frequent episode $\alpha_j$ with an EGH. The EGH, $\Lambda_{\alpha j}$, is based on the episode's frequency in the data. Associating each significant frequent episode with a HMM comprises constructing a tuple comprising a state space vector of dimension twice the length of the episode, a symbols vector of symbols emitted from a plurality of corresponding episode states, and a noise parameter, as described below.

Considering an N-node episode, $\alpha=(A_1\to \ldots \to A_N)$, associated with an EGH, $\Lambda_\alpha$, the EGH $\Lambda_\alpha$ has 2N states, where the states 1 through N constitute the episode states, and states (N+1) to 2N, the noise states. The symbol probability distribution in episode state, i, $1 \leq i \leq N$, is the delta function, $\delta_{A_i}(\bullet)$. All transition probabilities are fully characterized through what is known as the EGH noise parameter, $\eta\epsilon(0, 1)$, where transitions into noise states have probability η, while transitions into episode states have probability (1−η). The initial state for the EGH is state 1 with probability (1−η), and state 2N with probability η. An example of a 3-node episode is described below for the case of N=3 as shown in FIG. 3.

Figure 3:
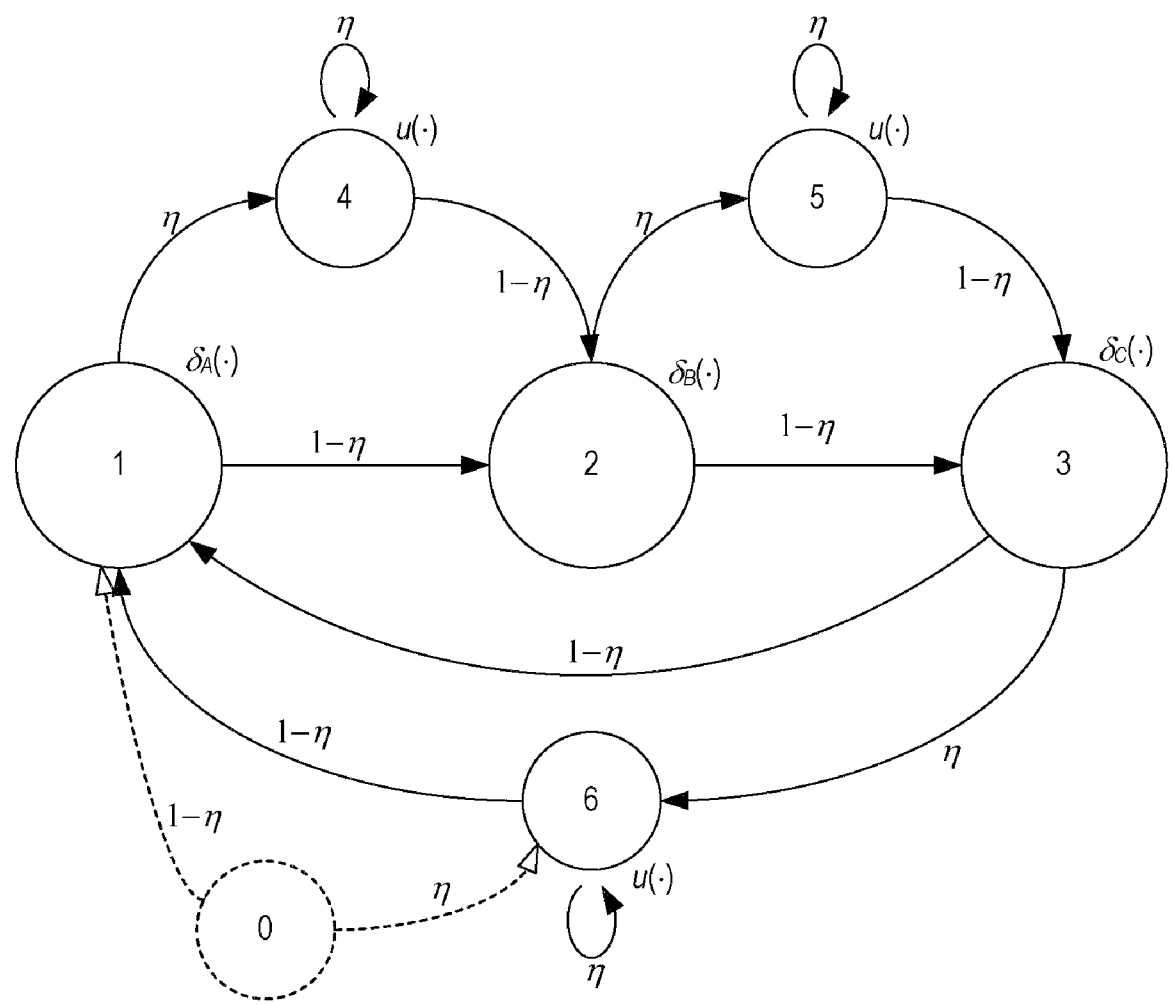
FIG. 3 shows an example embodiment of an Episode Generating Hidden Markov Model (EGH) corresponding to an example episode.

FIG. 3 illustrates an example EGH corresponding to an example episode (A→B→C). Such an episode has 2N=6 states, where states 1-3 are episode states and states 4-6 are noise states. The dotted circle, along with its outgoing arcs, represents the initial state probability distribution. The symbol probabilities are shown alongside corresponding nodes. For example, $\delta_A(\bullet)$ denotes a probability density function of 1 for symbol A and 0 for all others. Likewise for $\delta_B(\bullet)$ and $\delta_C(\bullet)$. Transitions into noise states have probability η, while transitions into episode states have probability (1−η). The uniform probability density function over the symbol set is denoted by $u(\bullet)$. This example EGH may only emit an "A" in state 1, a "B" in state 2 and a "C" in state 3. If η is small, the output sequence generated by this example EGH would be an event sequence with many occurrences of the episode (A→B→C).

Continuing with FIG. 2, associating each significant frequent episode with an EGH further comprises the following. For an N-node episode $\alpha=(A_1\to \ldots \to A_N)$ which occurs in the data, $D_Y=\{X_1, X_2, \ldots, X_K\}$, with frequency, $f_\alpha$, the EGH associated with α is denoted by the tuple, $\Lambda_\alpha=(S, A_\alpha, \eta_\alpha)$. Here, $S=\{1, \ldots, 2N\}$, denotes the state space, $A_\alpha=(A_1, \ldots, A_N)$, denotes the symbols that are emitted from the corresponding episode states, and η, the noise parameter, is set equal to $$\frac{T - Nf_\alpha}{T}$$

if it is less than $$\frac{M}{M+1}$$

and to 1 otherwise.

Next method 200, at 218, comprises building the generative model by forming a weighted mixture of the HMMs for the target event type. Process 218 further comprises at 220, forming a weighted mixture of the HMMs by using an Expectation Maximization (EM) algorithm to estimate a plurality of mixture coefficients. A more detailed discussion of the structure of the weighted mixture of HMMs follows.

For a set of significant episodes $F_s=\{\alpha_1, \ldots, \alpha_J\}$, and EGH $\Lambda_{\alpha j}$ associated with each $\alpha_j$ for $j=1, \ldots, J$, each sequence $X_i \in D_Y$ is now assumed to be generated by a mixture of the EGHs, $\Lambda_{\alpha j}, j=1, \ldots, J$. Denoting the mixture of EGHs by $\Lambda_Y$, and assuming that the K sequences in $D_Y$ are independent, the likelihood of $D_Y$ under the mixture model may be written as follows:

$$P[D_Y | \Lambda_Y] = \prod_{i=1}^{K} P[X_i | \Lambda_Y]$$

$$= \prod_{i=1}^{K} \left( \sum_{j=1}^{J} \theta_j P[X_i | \Lambda_{\alpha j}] \right).$$

Here, each EGH, $\Lambda_{\alpha j}$, may be fully characterized by the significant episode, $\alpha_j$, and its corresponding noise parameter, $\eta_j$. Consequently, the only unknowns in the expression for likelihood under the mixture model are the mixture coefficients, $\theta_j, j=1, \ldots, J$. An Expectation Maximization (EM) algorithm is used to estimate the mixture coefficients of $\Lambda_Y$ from the data set $D_Y$, and is described in more detail as follows.

Let $\theta^g=\{\theta_1^g, \ldots, \theta_J^g\}$ denote the current guess for the mixture coefficients being estimated. At the start of the EM procedure $\theta^g$ is initialized uniformly, i.e. $\theta_j^g$ is set to be $$\theta_j^g = \frac{1}{J}$$

for all j. By regarding $\theta_j^g$ as the prior probability corresponding to the $j^{th}$ mixture component $\Lambda_{\alpha j}$, the posterior probability for the $l^{th}$ mixture component, with respect to the $i^{th}$ sequence $X_i \in D_Y$, can be written using Bayes' Rule:

$$P[l \mid X_i, \Theta^g] = \frac{\theta_l^g P[X_i \mid \Lambda_{\alpha l}]}{\sum_{j=1}^{J} \theta_j^g P[X_i \mid \Lambda_{\alpha j}]}.$$

After computing $P[l|X_i, \Theta^g]$ for $l=1, \ldots, J$ and $i=1, \ldots, K$, using the current guess $\Theta^g$, a revised estimate may be obtained, $\Theta^{new} = \{\Theta_1^{new}, \ldots, \Theta_J^{new}\}$, for the mixture coefficients using the following update rule:

$$\text{for } l = 1, \ldots, J, \text{ compute: } \theta_l^{new} = \frac{1}{K} \sum_{i=1}^{K} P[l \mid X_i, \Theta_g].$$

The revised estimate $\Theta^{new}$, is used as the "current guess" $\Theta^g$, in the next iteration, and the procedure, namely the computation of the prior two equations, is repeated until convergence. Note that computation of the likelihood, $P[X_i|\Lambda_{\alpha j}]$, $j=1, \ldots, J$ needed in the Bayes' Rule equation, is done efficiently by approximating each likelihood along the corresponding most likely state sequence, $$P[X_i \mid \Lambda_{\alpha l}] = \left(\frac{\eta_\alpha}{M}\right)^T \left(\frac{1-\eta_\alpha}{\eta_\alpha/M}\right)^{N f_\alpha(X_i)},$$

where $f_\alpha(X_i)$ refers to frequency of episode $\alpha$ in sequence $X_i$. This way, the likelihood is a simple by-product of the non-overlapped occurrences-based frequency counting algorithm. Even during the prediction phase, to be discussed later, this approximation may be used when computing the likelihood of the current window, X, of events, under the mixture model, $\Lambda_Y$.

One property of the EGH association is given by the following theorem. Let $D_Y = \{X_1, X_2, \ldots, X_K\}$ be the given data set of event sequences over the set E (of size $|E|=M$). Let $\alpha$ and $\beta$ be two N-node episodes occurring in $D_Y$ with frequencies $f_\alpha$ and $f_\beta$ respectively. Let $\Lambda_\alpha$ and $\Lambda_\beta$ be the EGHs associated with $\alpha$ and $\beta$. Let $q_\alpha^*$ and $q_\beta^*$ be the most likely state sequences for $D_Y$ under $\Lambda_\alpha$ and $\Lambda_\beta$ respectively. If $\eta_\alpha$ and $\eta_\beta$ are both less than $$\frac{M}{M+1}$$

then, (i) $f_\alpha > f_\beta$ implies $P(D_Y, q_\alpha^* | \Lambda_\alpha) > P(D_Y, q_\beta^* | \Lambda_\beta)$ and (ii) $P(D_Y, q_\alpha^* | \Lambda_\alpha) > P(D_Y, q_\beta^* | \Lambda_\beta)$ implies $f_\alpha \geq f_\beta$.

Stated informally, the result shows that, among sufficiently frequent episodes, the more frequent episodes may be associated with EGHs with higher data likelihoods. Therefore, for any episode, $\alpha$, with $$\eta_\alpha < \frac{M}{M+1},$$

the joint probability of the data $D_Y$, and the most likely state sequence $q_\alpha^*$, is given by $$P[D_Y, q_\alpha^* \mid \Lambda_\alpha] = \left(\frac{\eta_\alpha}{M}\right)^T \left(\frac{1-\eta_\alpha}{\eta_\alpha/M}\right)^{N f_\alpha}.$$

Continuing with FIG. 2, method 200, at 222, lastly comprises outputting the generative model. In the context of the specific embodiments described above, process 222 may comprise, at 224, outputting the generative model $\Lambda_Y$.

Figure 4:
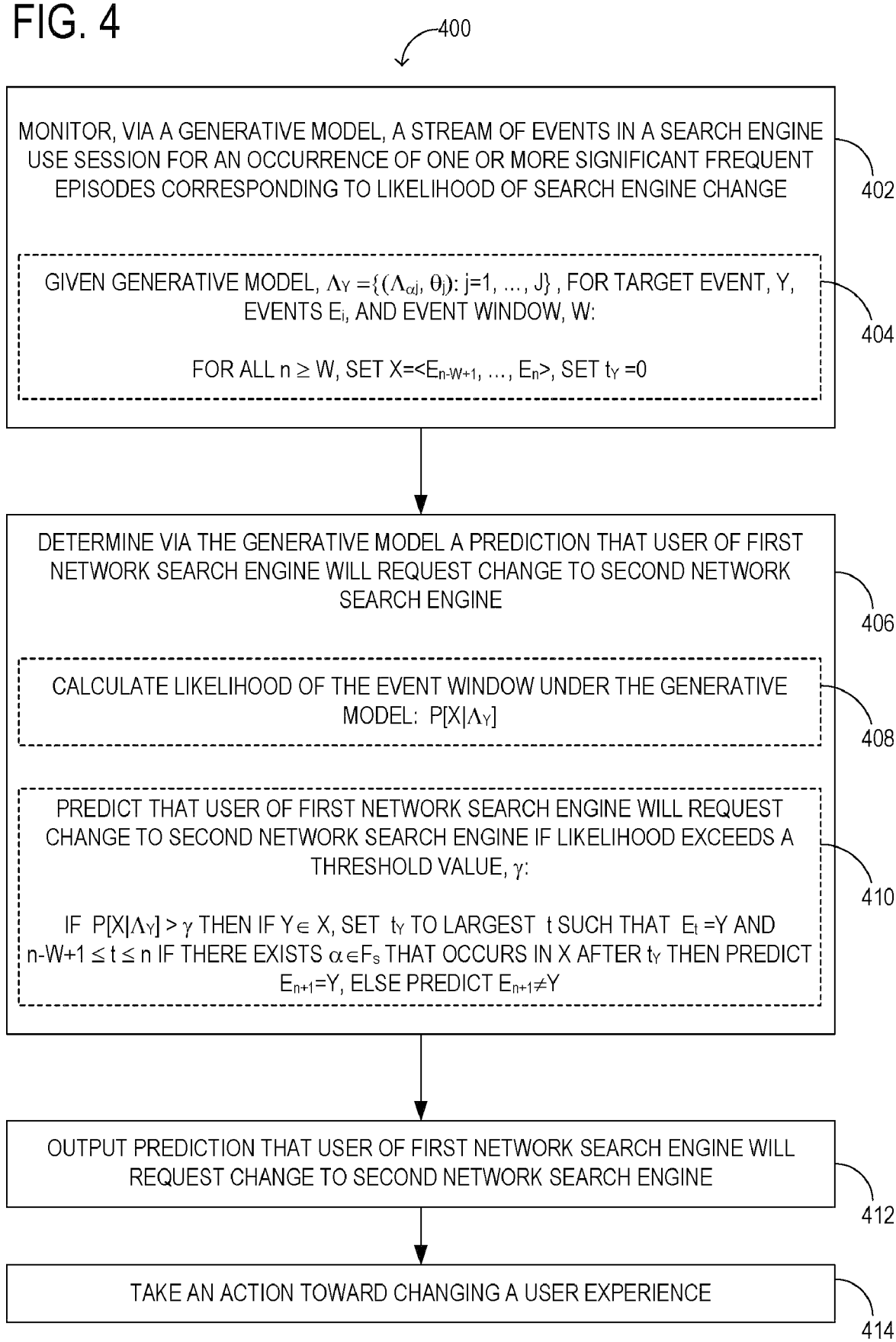
FIG. 4 shows a process flow depicting an embodiment of a method of predicting a user requesting a change from a first network search engine to a second network search engine.

After production of the generative model, the model may be used to predict future occurrences of events of a target event type. For example, FIG. 4 depicts an embodiment of a method 400 of predicting whether a user of a first network search engine will request a change to a second network search engine. Method 400 at 402 comprises monitoring, via a generative model comprising a weighted mixture of HMMs, a stream of events in a search engine use session between the user and the first network search engine for an occurrence of one or more significant frequent episodes corresponding to a likelihood of a search engine change. In some embodiments, the weighted mixture of HMMs may comprise a weighted mixture of EGHs. Further, such a request to change to the second network search engine may be represented in the generative model by a target event type within the stream of events. Therefore, requesting a change to a second network search engine comprises detecting a significant frequent episode preceding the target event type as recognized by the generative model.

In one embodiment, as illustrated at 404, monitoring the stream of events comprises monitoring a fixed-length event window. In alignment with the framework introduced in the discussion of FIG. 2, consider the event stream $s = \langle E_1, \ldots, E_n, \ldots \rangle$ in which a future occurrence of target event type Y is to be predicted. For n denoting the current time instant, a W-length window of events up to and including the $n^{th}$ event in s is constructed, $X = [E_{n-w+1}, \ldots, E_n]$. A condition the algorithm uses to predict $E_{n+1} = Y$ is based on the likelihood of the window, X, of events under the mixture model, $\Lambda_Y$. Thus, 402 further comprises at 404, given a generative model, $\Lambda_Y = \{(\alpha_j, \theta_j):j=1, \ldots, J\}$, for all $n \geq W$, setting $X = \langle E_{n-W+1}, \ldots, E_n \rangle$ and setting $t_Y = 0$.

Next, method 400 at 406 comprises determining via the generative model a prediction that the user of the first network search engine will request a change to the second network search engine. As illustrated at 408, in some embodiments, process 406 may further comprise determining this prediction by calculating a likelihood $P[X|\Lambda_Y]$ of the event window X under the generative model $\Lambda_Y$. Further, as illustrated at 410, in some embodiments, process 406 may further comprise predicting that the user of the first network search engine will request a change to the second network search engine if the likelihood exceeds a threshold value $\gamma$. The threshold value $\gamma$ may be selected during the training phase for a chosen level of recall, or may be selected in any other suitable manner.

However, in some embodiments, this threshold condition may be considered insufficient by itself to predict an occurrence of event type Y, for the following reason. The likelihood $P[X|\Lambda_Y]$ will be high whenever X contains one or more occurrences of significant episodes (from $F_s$). These occurrences, however, may correspond to a previous occurrence of Y within X, and hence may not be predictive of any future occurrence(s) of Y. To address this possibility, a simple heuristic may be used that first identifies the last of occurrence of Y (if any) within the window X and remembers the corresponding location in $t_Y$. The algorithm predicts $E_{n+1}=Y$ only if, in addition to $P[X|\Lambda_Y]>\gamma$, there exists at least one occurrence of a significant episode after the last occurrence of Y in X. This heuristic may be easily implemented using the frequency counting algorithm of frequent episode discovery. Thus, if $P[X|\Lambda_Y]>\gamma$ then if $Y \in X$ then set $t_Y$ to the largest t such that $E_t=Y$ and $n-W+1 \leq t \leq n$ if there exists an $\alpha \in F_s$ that occurs in X after $t_Y$ then predict $E_{n+1}=Y$. Otherwise, predict $E_{n+1} \neq Y$.

Continuing with FIG. 4, method 400 comprises, at 412, outputting the prediction that the user of the first network search engine will request a change to the second network search engine, and, at 414, taking an action toward changing a user experience in response to the prediction.

Taking an action toward changing a user experience at 414 may include one or more of sending a message to the user, offering the user search assistance, adapting the user experience on the user's behalf, and recommending an action for the user to take. For example the origin, or pre-switch, engine may offer users a new interface affordance (e.g., sort search results based on different meta-data), or search paradigm (e.g., engage in an instant messaging conversation with a domain expert) to encourage them to stay. In contrast, the destination, or post-switch, engine could pre-fetch search results in anticipation of the incoming query. Furthermore, such a message may be sent to the user in any suitable manner, such as by sending one or more of an instant message, an email message, an internet telephone message, or a live chat request message.

Figure 5:
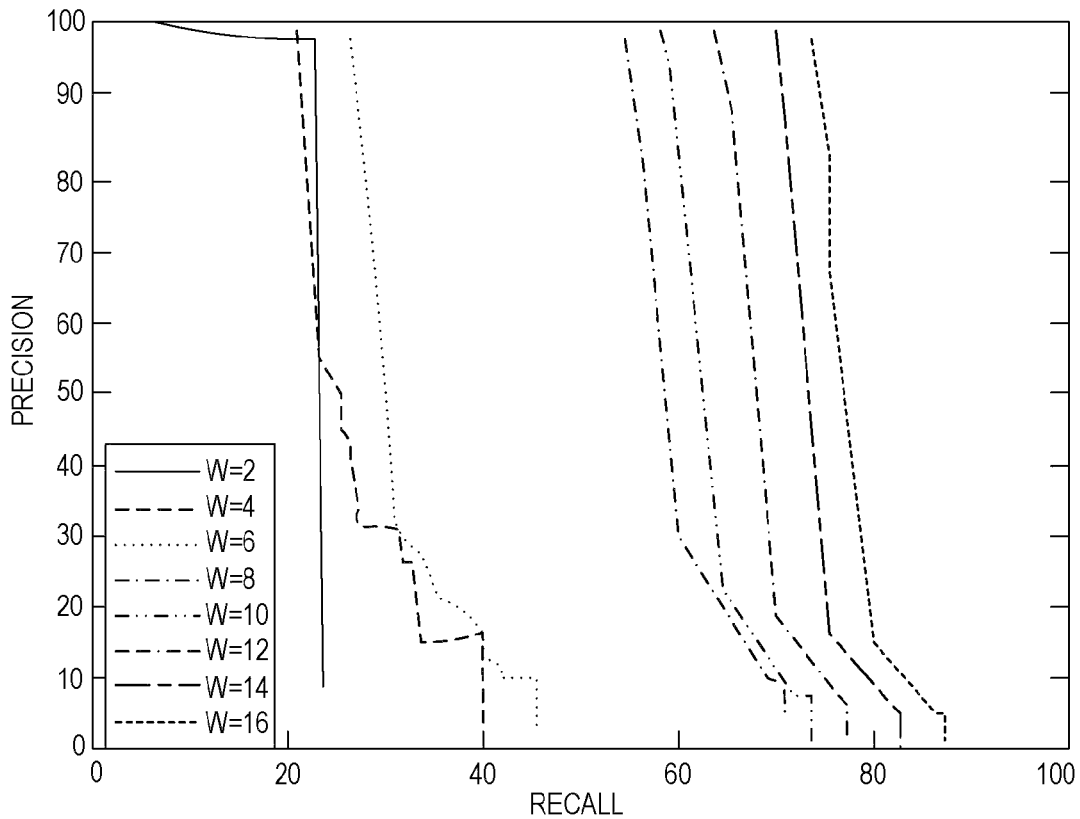
FIG. 5 shows a graph depicting search engine switch prediction performance for difference lengths, W, of preceding sequences.

FIG. 5 illustrates a graph depicting search engine switch prediction performance for difference lengths, W, of preceding sequences. Experiments were conducted using EGHs to predict whether a user will switch search engines, given the user's recent interaction history with the search engine. Three months of interaction logs were analyzed, where the interaction logs were obtained during November 2006, December 2006, and May 2007 from hundreds of thousands of consenting users through an installed browser tool-bar. All personally identifiable information was removed from the logs prior to this analysis. In each month's data, the first half of the data was used for algorithm training and the second half of the data was used for algorithm testing.

From these logs, search sessions were extracted. Every session began with a query to one of four internet search engines, and contained either search engine result pages, visits to search engine homepages, or pages connected by a hyperlink trail to a search engine result page. A session ended if the user was idle for more than 30 minutes. Users with less than five search sessions were removed to reduce potential bias from low numbers of observed interaction sequences or erroneous log entries. A search engine switch was defined as one of three behaviors within a session: (i) issuing a query to a different search engine, (ii) navigating to the homepage of a different search engine, or (iii) querying for a different search engine name. Around 8% of search sessions extracted from the logs contained a search engine switch.

Each search session was represented as a character sequence to allow for easy manipulation and analysis, and to remove any identifying information. This allows privacy to be protected while preserving the salient aspects of search behavior to perform the predictive analyses. To represent the search sessions, an set was formed with the goal of maximum simplicity. Since page dwell times may be useful information, page dwell times were encoded as well. In this analysis, dwell times were bucketed into 'short', 'medium', and 'long' based on a tripartite division of the dwell times across all users and all pages viewed.

Many millions of such sequences were extracted from the interaction logs to use in the training and testing of the prediction algorithm. Further, these sequences were encoded using one symbol for every action-page pair. An action is a user interaction event such as a hyperlink click. A page in this case is a Web page, although could be any information object, with interaction attributes such as display time. The set used had 62 symbols total, which reduced to 55 symbols by considering all pairs with a Y as a single symbol, where Y is the target event type. For example, if a user issued a query, viewed the search result page for a short period of time, clicked on a result link, viewed the page for a short time, and then decided to switch search engines, the session would be represented as 'QRSPY,' where Q=Issue Query, R=Visit first search engine result page (SERP) (short display time), S=Click result hyperlink, P=Visit non-SERP page (short display time), and then Y=Switch search engine.

One challenge in predicting a change of search engines derives from the very low number of switches compared to non-switches. For example, in one data set, the most common string preceding a switch occurred about 2.6 million times, but led to a switch only 14,187 times. A string-matching algorithm used as a control described above obtained high precision (>85%) at low recall (5%). However, precision reduced rapidly as recall increased (i.e., to a precision of less than 20% at a recall of 20%). The results did not improve for different window lengths. This trend was also observed in the second and third data sets.

In contrast, the results obtained for search engine switch prediction using the EGH mixture model described herein demonstrate high precision even at higher recall. First, FIG. 5 illustrates a graph depicting search engine switch prediction performance for difference lengths, W, of preceding sequences, for results obtained using the approach described herein for one of the three test data sets, with the first half of the data used for training and the second half of the data used for testing. A range of values for W between 2 and 16 was examined. For W=16, the algorithm achieves a precision greater than 95% at recalls between 75% and 80%.

Figure 6:
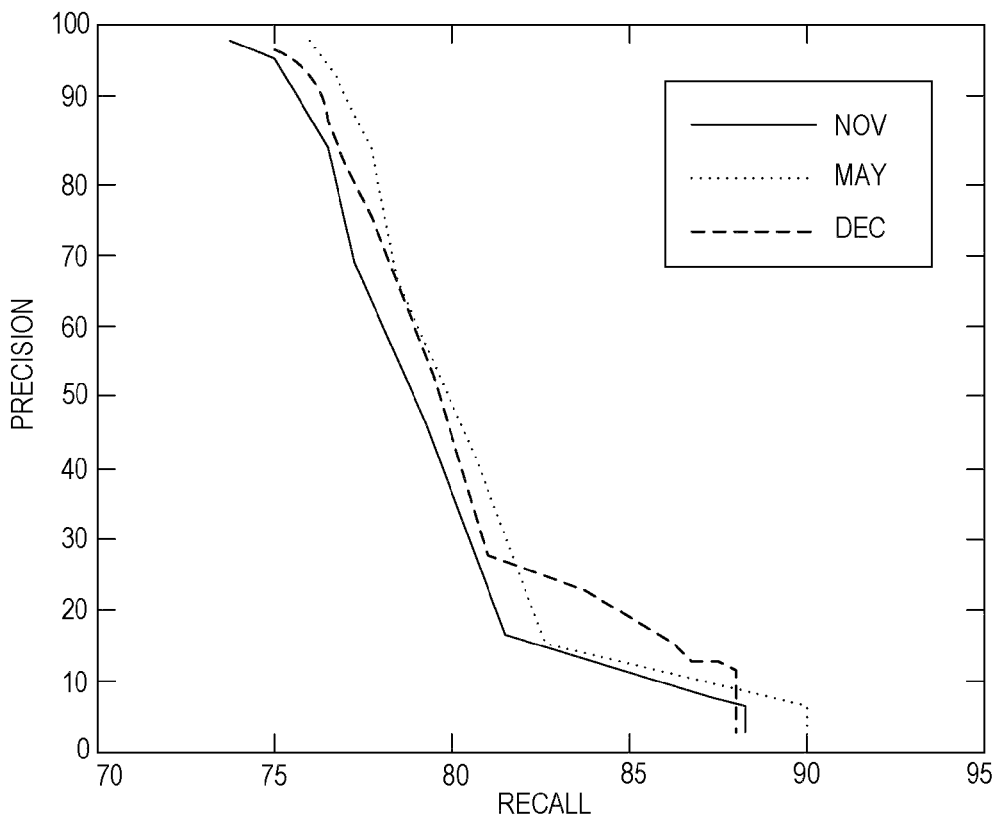
FIG. 6 shows a graph depicting search engine switch prediction performance for test sequences that are W=16 events long.

Next, FIG. 6 illustrates a graph depicting search engine switch prediction performance for test sequences that are W=16 events long. In this test, one full data set of the three data sets was used to produce the generative model, and the resulting generative model was used to test prediction performance all three sets of data. Again, the approach described herein achieved precision greater than 95% at recalls between 75% and 80%. Similar results were obtained when the algorithm was trained using the data from each of the other two sets of data and used to predict search engine switches on the test sets from all three months.

While described in the context of predicting a switch of search engines, it will be understood that the embodiments described herein may be applicable to other use environments as well, including but not limited to applications in biology, manufacturing, network usage, finance, etc. such as predicting major breakdowns from a sequence of faults logged in a manufacturing plant to avoid future breakdowns, and/or detecting system failures in computer networks. It will further be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will further be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various embodiments disclosed herein, as well as any and all equivalents thereof.

The invention claimed is:

1. A method of predicting a search engine switch, the method comprising:
   tracking via a generative model a sequence of events initiated by a user in a search engine use session;
   predicting via the generative model whether the user will request to switch search engines based upon the sequence of events tracked; and
   in response to predicting a search engine switch and prior to the user requesting a search engine switch, taking an action toward changing an experience of the user;
   wherein the generative model was previously formed by
     building a training set of user search data from an initial set of user search data, the initial set of user search data comprising a plurality of sequences of search events, by extracting a selected number of search events preceding each occurrence of an event of a target search event type from the initial set of user search data;
     extracting a plurality of frequent episodes from the training set of user search data, each episode comprising an ordered sequence of search events in the training set of user search data;
     filtering the plurality of frequent episodes to determine a plurality of significant frequent episodes;
     associating each significant frequent episode with an HMM in which a frequency ordering among the significant frequent episodes is preserved as a likelihood ordering among a corresponding mixture of HMMs; and
     building the generative model by forming a weighted mixture of the HMMs for the target search event type.

2. The method of claim 1, wherein tracking a sequence of events in a search engine use session comprises monitoring a fixed-length event window for an occurrence of one or more significant frequent episodes corresponding to a likelihood of a search engine change.

3. The method of claim 2, further comprising using a generative model comprising a weighted mixture of Episode Generating Hidden Markov Models (EGHs).

4. The method of claim 2, wherein predicting a search engine switch comprises calculating a likelihood of the event window under a generative model and comparing the likelihood to a threshold value.

5. The method of claim 1, wherein taking an action toward changing an experience of the user comprises offering the user a change in a user interface setting.

6. The method of claim 1, wherein taking an action toward changing an experience of the user comprises one or more of sending a message to the user, offering the user search assistance, adapting the experience of the user on the user's behalf, and recommending an action for the user to take.

7. The method of claim 6, wherein sending the message to the user comprises sending one or more of an instant message, an email message, an internet telephone message, or a live chat request message.

8. A computing device comprising:
   a logic subsystem; and
   memory comprising instructions executable by the logic subsystem to:
   build a training set of user search data from an initial set of user search data, the initial set of user search data comprising a plurality of sequences of search events, by extracting a selected number of search events preceding each occurrence of an event of a target search event type from the initial set of user search data;
   extract a plurality of frequent episodes from the training set of user search data, each episode comprising an ordered sequence of search events in the training set of user search data;
   filter the plurality of frequent episodes to determine a plurality of significant frequent episodes;
   associate each significant frequent episode with a Hidden Markov Model (HMM) in which a frequency ordering among the significant frequent episodes is preserved as a likelihood ordering among a corresponding mixture of HMMs;
   build a generative model by forming a weighted mixture of the HMMs for the target search event type; and
   output the generative model.

9. The computing device of claim 8, wherein each sequence of search events in the initial set of user search data is a search session on a search engine server.

10. The computing device of claim 8, wherein the instructions are executable to extract a selected number of events by receiving a user-defined model parameter of a length of an event window, and extracting a number of events equal to the length of the event window.

11. The computing device of claim 8, wherein each event is associated with a value from a finite set of events, each value corresponding to a user action or to a page feature of a page visited during a search session on a search engine server.

12. The computing device of claim 11, wherein the instructions are executable to filter the frequent episodes to determine the significant frequent episodes by applying a significance test based on a frequency of one or more of the frequent episode, a length of the training set and a size of the finite set of events.

13. The computing device of claim 8, wherein the instructions are executable to form a weighted mixture of the HMMs by using an Expectation Maximization (EM) algorithm to estimate a plurality of mixture coefficients.

14. The computing device of claim 8, wherein the instructions are executable to extract the frequent episodes by extracting non-overlapping episodes occurring in the training set of user search data, wherein the non-overlapping episodes occurring in the training set of user search data each comprises a plurality of events in the sequences of search events appearing in a same relative ordering as in the episode.

15. A method of predicting whether a user of a first network search engine will request a change to a second network search engine, the method comprising:
- monitoring, via a generative model comprising a weighted mixture of Hidden Markov Models (HMMs), a stream of events in a search engine use session between the user and the first network search engine for an occurrence of one or more significant frequent episodes corresponding to a likelihood of a search engine change;
- determining via the generative model a prediction that the user of the first network search engine will request a change to the second network search engine; and
- outputting the prediction that the user of the first network search engine will request a change to the second network search engine;
- wherein the generative model was previously formed by
  - building a training set of user search data from an initial set of user search data, the initial set of user search data comprising a plurality of sequences of search events, by extracting a selected number of search events preceding each occurrence of an event of a target search event type from the initial set of user search data;
  - extracting a plurality of frequent episodes from the training set of user search data, each episode comprising an ordered sequence of search events in the training set of user search data;
  - filtering the plurality of frequent episodes to determine a plurality of significant frequent episodes;
  - associating each significant frequent episode with an HMM in which a frequency ordering among the significant frequent episodes is preserved as a likelihood ordering among a corresponding mixture of HMMs; and
  - forming the weighted mixture of the HMMs.

16. The method of claim 15, wherein a request to change to the second network search engine is represented in the generative model by a target event type within the stream of events.

17. The method of claim 16, wherein the request to change to the second network search engine is detected as a significant frequent episode preceding the target event type as recognized by the generative model.

18. The method of claim 15, wherein monitoring the stream of events comprises monitoring a fixed-length event window.

19. The method of claim 18, wherein determining a prediction comprises calculating a likelihood of the event window under the generative model, if there exists at least one occurrence of a significant episode after a last occurrence of a target event type in the event window, and predicting that the user of the first network search engine will request a change to the second network search engine if the likelihood exceeds a threshold value.

20. The method of claim 15, further comprising taking an action toward changing a user experience during the search engine use session in response to the prediction that the user of the first network search engine will request the change to the second network search engine.

* * * * *